(12) United States Patent
Thullen et al.

(10) Patent No.: US 7,132,141 B2
(45) Date of Patent: Nov. 7, 2006

(54) MULTILAYER POLYMER HOSE LINE OR TUBING HAVING REDUCED LENGTH VARIATIONS

(75) Inventors: Helmut Thullen, Bonaduz (CH); Georg Stoeppelmann, Bonaduz (CH); Ralph Kettl, Bonaduz (CH); Michael Hoffmann, Bonaduz (CH)

(73) Assignee: Ems-Chemie AG, Domat/Ems (CH)

( * ) Notice: Subject to any disclaimer, the term of this patent is extended or adjusted under 35 U.S.C. 154(b) by 59 days.

(21) Appl. No.: 10/430,320

(22) Filed: May 7, 2003

(65) Prior Publication Data

US 2003/0232207 A1    Dec. 18, 2003

(30) Foreign Application Priority Data

May 7, 2002    (EP)    ................................. 02010352

(51) Int. Cl.
*B32B 27/08*    (2006.01)
(52) U.S. Cl. ................. 428/36.91; 428/36.8; 428/35.7; 428/36.6; 428/476.3; 428/474.4; 138/173; 138/137; 138/140; 138/141; 138/121
(58) Field of Classification Search ............... 428/36.8, 428/35.7, 36.6, 36.91, 476.3, 476.4; 138/121, 138/173, 137, 140, 141
See application file for complete search history.

(56) References Cited

U.S. PATENT DOCUMENTS

| | | | | |
|---|---|---|---|---|
| 4,957,968 A | * | 9/1990 | Adur et al. | .................... 525/74 |
| 5,191,916 A | | 3/1993 | Kanao | |
| 5,342,886 A | * | 8/1994 | Glotin et al. | .................. 525/66 |
| 5,706,864 A | * | 1/1998 | Pfleger | ........................ 138/121 |
| 5,850,855 A | * | 12/1998 | Kerschbaumer et al. | .... 138/137 |
| 6,005,052 A | | 12/1999 | Venkataswamy et al. | |
| 6,020,431 A | | 2/2000 | Venkataswamy et al. | |
| 6,207,758 B1 | * | 3/2001 | Brinati et al. | ................ 525/200 |
| 6,240,970 B1 | * | 6/2001 | Ostrander et al. | ........... 138/137 |
| 6,592,957 B1 | * | 7/2003 | Uchida et al. | .............. 428/36.8 |
| 2002/0182356 A1 | * | 12/2002 | Guippe | ..................... 428/36.91 |
| 2003/0008087 A1 | * | 1/2003 | Peduto | ........................ 428/35.7 |

FOREIGN PATENT DOCUMENTS

| | | |
|---|---|---|
| DE | 43 21 575 | 11/1994 |
| DE | 44 28 236 | 11/1995 |
| DE | 44 32 584 | 2/1996 |
| DE | 198 45 235 | 5/2000 |
| EP | 0 342 066 | 3/1989 |
| EP | 0 368 096 | 5/1990 |
| EP | 0 656 388 | 6/1995 |

(Continued)

*Primary Examiner*—William P. Watkins, III
(74) *Attorney, Agent, or Firm*—Browdy and Neimark, PLLC

(57) ABSTRACT

Two-layered or three-layered polymer tubing for use as a pressurized fluid conduit in automobiles can be either walled or have walls continuously or partially corrugated. The tubing has an outer layer of a hard polymer molding material and an inner layer of a soft rubber-like polymer or a polymer mixture. The inner layer can be provided on the innerside with a layer of a thermoplastic adhesion-modified elastomer composition. The a materials are selected for the layers to provide a so-called "hard-soft-combination". The rubber-like polymer composition has a hardness in the range of 30 Shore A to 60 Shore D, especially of about 30 Shore A to 90 Shore A, the compositions being selected so that they are processable by coextrusion or the so-called conex method and adhere directly to each other non-positively or positively fitted, i. e. without additional bonding agent, without delaminating.

12 Claims, 3 Drawing Sheets

FOREIGN PATENT DOCUMENTS

| | | |
|---|---|---|
| EP | 0 671 582 | 9/1995 |
| EP | 0 753 027 | 10/1997 |
| EP | 0 754 898 | 5/1998 |
| EP | 1 074 581 | 2/2001 |
| EP | 0 863 351 | 4/2001 |
| FR | 2 291 225 | 6/1979 |
| FR | 2 802 274 | 6/2001 |
| GB | 1 209 569 | 10/1970 |
| GB | 1220975 | 1/1971 |
| WO | WO 90/13113 | 11/1990 |
| WO | WO 92/15497 | 9/1992 |
| WO | WO 97/28949 | 8/1997 |
| WO | WO 97/39270 | 10/1997 |
| WO | WO 01/18116 | 3/2001 |

\* cited by examiner outer layer (3)
inner layer (4)
inner layer (5)

MULTILAYER POLYMER HOSE LINE OR TUBING HAVING REDUCED LENGTH VARIATIONS

FIELD OF THE INVENTION

The present invention relates to two-layered or three-layered polymer hose lines or tubings for use as pressurized fluid conduits in automobiles.

BACKGROUND OF THE INVENTION

Air ducts and liquid conduits, such as for example cooling liquid conduits, are still commonly fabricated from textile-armored rubber pipes and rubber hoses. Pipes and hoses of thermoplastics present in contrast thereto a significant reduction of costs and weight and additionally possess an improved recycling potential. However, comparable flexural flexibility such as achieved with rubber pipes is required for the thermoplastic pipes in this material substitution.

Especially, the higher material stiffness of the relevant thermoplastics can be compensated by providing the pipe with a corrugated structure. This geometry, which is known simply as corrugated pipe, exists in different embodiments. But the flexural flexibility achieved in this way deteriorates the tensile stiffness, i.e. a higher extension of the pipe has to be accepted for a tensile load.

From DE 44 32 584 C1 (Ems-Inventa AG), there is known a corrugated pipe, wherein the corrugations extend over all radial sectors in the longitudinal direction. EP 0 671 582 A1, DE 43 21 575 C1 as well as GB 12 09 569 describe further known corrugated pipes. These known constructions have external contours which ensure a corrugated line in all radial sectors on the pipe surface area.

A corrugated pipe which has corrugations formed in zones facing each other and being otherwise free of corrugations is known from GB 12 20 975.

In contrast thereto, EP 863 351 B1 (Ems-Inventa AG) describes a pressurizable one-lumic corrugated pipe having a high flexural flexibility and high bursting pressure strength, which does not require additional reinforcing means and has a low extension in pressurizing. The external contours of the corrugated pipe described in EP 863 351 B1 are formed so that, in two zones on the pipe surface area approximately facing each other, a corrugation of the pipe can be abandoned completely. The zones free of corrugation are continuous in the longitudinal direction and can have in principle the shape of any curve. Preferably, they are arranged continuously straight, helically or sectionally straight in varying angular positions. However, the geometry described in EP 863 351 B1 is very costly to produce; and thus great quantities of corrugated pipes are today still produced with a conventional, symmetric, circular corrugated pipe profile.

The production of the aforementioned polymer hose lines or tubings is performed by coextrusion of a polymer pipe or by the so-called conex method, and then formation of the corrugations by blow or vacuum molding. Alternatively, these conduits can be produced by coextrusion blow molding. In principle, such production takes place as a continuous hollow body blow molding. The cylindrical portion of the pipe die extends into the closed region of a circulating molding chain. The plastic hose is pressed by inner overpressure or by a vacuum to the profiled circulating molding followers so that the desired corrugated pipe profile is achieved. By the further passage up to the opening of the mold closure, the plastic hose has to be cooled down sufficiently so that it leaves the circulating mold followers in a dimensionally stable state. For example, EP 368 096 A1 (Lupke) describes a device for producing plastic pipes having spirally corrugated sections.

EP 754 898 B1 (Ems-Inventa AG) describes an uncorrugated three-layer flexible cooling liquid conduit having high hydrolysis and burst pressure resistance, which consists of an outer layer of polyamide 12, hereinafter sometimes PA12, an inner layer of cross-linked HDPE and an intermediate layer of grafted maleic anhydride HDPE. Such intermediate layer serves exclusively for the purposes of coupling so that no delamination of the layers occurs. Of course, the need for such intermediate layer make the production of this three-layer tubing more expensive.

U.S. Pat. No. 5,191,916-A describes pipes having a spiral geometry, the helixes of which are reinforced with metal insertions. This reinforcement is necessary for freely laid subterranean tubings to provide strength against high outer and inner pressures. However, the production of such pipes is very costly and thus the resultant pipes are very expensive.

WO 97/39270 (Valeo) describes a multilayer plastic conduit for fluids having a polyamide outer layer, an inner layer of polyethylene and an intermediate bonding layer to prevent delamination. The conduit described in WO 97/39270 has a continuously corrugated wall more particularly a spirally corrugated wall. As a result, the screws or helixes on the outside of the pipe are broader than those on the inside. Further, the screws or helixes on the outside are flattened.

EP 486 962 A1 describes a corrugated pipe having spiral geometry which is provided at the ends on the outside with threads and which extends conically on the inside towards the ends. Therefore, the subject matter of the EP 486 962 is a flexible sleeve for use in the field of protective coverings for cables to ensure the pushing-through of cables in a better way.

EP 574 449 A1 describes a corrugated pipe having corrugations in the longitudinal and the transversal directions to the pipe axis, wherein the latter can also extend spirally. A special feature of the EP 574 449 A1 is that the thickness of the corrugated wall on the inside, i.e. on the inner bend, is reduced. A narrower bending radius is thus achieved at mild material stressing, wherein stiffness and compression resistance are maintained. However, this construction does not solve the problem endemic among plastic pipes of elongating when hot, i.e. the problems to reduce the extension in the hot state is not solved by this construction.

EP 671 582 B1 (Ems-Inventa AG) describes cooling liquid conduits of several polymer layers having polymers which are compatible with one another on the contact surfaces of the layers, wherein single adjacent corrugations of a corrugated section are connected to each other by at least one rib on the inner contour of the corrugations, and the webs are formed by a bead-like deformation of the pipe wall, and wherein successive webs are displaced continuously in the longitudinal direction of the conduit about a defined angle, and the webs are oriented parallel to the longitudinal axis of the conduit. Also, this construction does not solve the problem to reduce the extension in hot state.

DE 43 21 575 C1 (Rasmussen) describes a corrugated pipe of thermoplastic or a thermoplastic elastomer, wherein the corrugations are formed eccentrically in such a way that the inside of the wall portion is free of corrugations and it has at each site a circular cylindrical cross-section. In this manner liquids are said to be prevented from accumulating in the corrugated pipe in bottom portions of the depressions. This construction is very expensive to produce; and also it does not solve the problem of extension in the hot state.

DE 44 28 236 C1 (Rasmussen) describes a three-layer corrugated pipe which is intended for use as cooling liquid hose in automobiles. The inner layer of the multi-layer tubing according to DE 44 28 236 C1 consists of a plastic layer comprising a modified thermoplastic elastomer having a fully cross-linked rubber phase. A layer of polyamide and a further layer of a thermoplastic elastomer connect thereto, which comprises a copolymer of a functionalized polyolefin as main component and a polyamide as a compatibilizing agent. However, no details are given in relation to the selection of the polyamide material and those skilled in the art know that no tightly connection is present depending on the selection of the polyamide material, because incompatibilities occur, for example for polyamide 6 with polyamide 12; therefore, enablement is lacking. Also, the pipes described in DE 44 28 336 C1 do not solve the problem of reducing extension in the hot state.

FR 28 02 274 (Nobel Plastiques) describes a cooling liquid conduit for the field of automobiles which is formed by a layer of thermoplastic elastomer material and a thermoplastic layer of a blend of polyamide and polypropylene. Additionally, an outer protective layer of impact-resistant modified polyamide which encloses the layer of the polyamide-polypropylene blend is provided. The protective layer consists of impact-resistant modified polyamide.

SUMMARY OF THE INVENTION

Therefore, an object of the present invention is to provide a multilayer polymer hose line or tubing, especially with a special pipe geometry, which can be easily produced, which has the advantage of a lower extension and which can be easily welded onto adjacent molded portions of plastic or metal, by the combination of the outer and inner layer materials, in a simple manner so that they are tight and compression-proof at the junction points. Further, the outer layer materials (polyamides, preferably with additives) should be modified to improve the strength as well as to reduce the extension of the hose line or tubing in the processing direction.

Therefore, the invention relates to a multilayer polymer hose line or tubing resistant to length variations under different temperature conditions, made of thermoplastic polymers processable by coextrusion, for use as a pressurized fluid conduit, consisting of (a) an outer layer of a molding material on basis of copolyamides of a polymerizate of an aliphatic $C_6$ to $C_{12}$ lactam or ω-aminocarboxylic acid having 4 to 18 carbon atoms, or a homopolymer or copolymer obtainable by polycondensation of at least one diamine selected from the group consisting of aliphatic diamines having 4 to 12 C atoms, cycloaliphatic diamines having 7 to 22 C atoms and aromatic diamines having 6 to 22 C atoms, in combination with at least one dicarboxylic acid selected from the group consisting of aliphatic dicarboxylic acids having 4 to 12 C atoms, cycloaliphatic dicarboxylic acids having 8 to 24 C atoms; and aromatic dicarboxylic acids having 8 to 20 C atoms; or a blend of polymerizates and/or polycondensates, and (b) an inner layer which is bonded non-positively or tightly to the outer layer, said inner layer being formed of a molding material of a thermoplastic adhesion-modified elastomer composition (TPE) selected from the group consisting of:

(1) TPE materials of polyolefin elastomers comprising:
a thermoplastic polyolefin homopolymer or copolymer, which, optionally, is produced and is optionally compounded with a block copolymer of styrene/conjugated diene/styrene and/or its halogenated derivates,
at least a functionalized, cross-linkable rubber-like material selected from the group consisting of olefinic rubbers which are uncrosslinked, partially cross-linked or fully cross-linked, acrylates and silicones, and
a polyamide compatibilizing agent selected from the group consisting of copolyamides or adhesion-modified copolyamides or mixtures thereof, wherein the copolyamides are polymerizates of aliphatic $C_6$ to $C_{12}$ lactams or ω-aminocarboxylic acids having 4 to 18 carbon atoms, or polycondensates obtainable by polycondensation of at least one diamine of the group of the aliphatic diamines having 4 to 12 C atoms, the cycloaliphatic diamines having 7 to 22 C atoms and the aromatic diamines having 6 to 22 C atoms in combination with at least one dicarboxylic acid selected from the group consisting of aliphatic dicarboxylic acids having 4 to 12 C atoms, cycloaliphatic dicarboxylic acids having 8 to 24 C atoms and aromatic dicarboxylic acids having 8 to 20 C atoms, or blends of said polymerizates and/or polycondensates, (2) TPE materials of dynamically vulcanized rubbers in a polymer matrix, comprising
a thermoplastic polyolefin homopolymer or copolymer,
at least a vulcanizable elastomer selected from the group consisting of grafted carboxylated nitrile elastomers, acrylic elastomers, carboxylated polybutadienes, ethylene/propylene/diene terpolymers and mixtures of these polymers with the same elastomers, but which are not grafted such as nitrile rubbers, polybutadiene, ethylene/propylene/diene terpolymers or a mixture thereof (3) TPE materials of thermoplastic polystyrene elastomers (TPE-S) or modified styrene olefin elastomers or styrene olefin elastomers compounds, (4) TPE materials of thermoplastic chlorinated elastomers, (5) TPE materials of thermoplastic polyester elastomers, (6) TPE materials of thermoplastic polyamide elastomers, (7) TPE materials of thermoplastic fluorinated elastomers, and (8) TPE materials of thermoplastic polyurethane elastomers, wherein, a compatibilizing agent is optionally added to the TPE material (2) to (8), and (c) optionally, a third plastic layer on the inside of said inner layer, said optional third layer being formed of a molding material of a thermoplastic adhesion-modified elastomer composition (TPE) selected from the group consisting of (1) TPE materials of polyolefin elastomers comprising
a thermoplastic polyolefin homopolymer or copolymer, which, optionally, is produced, can be compounded with a block copolymer of styrene/conjugated diene/styrene and/or its halogenated derivates
at least a functionalized, cross-linkable rubber-like material selected from the group consisting of olefinic rubbers which are uncrosslinked, partially cross-linked or fully cross-linked, acrylates and silicones, (2) TPE materials of dynamically vulcanized rubbers in a polymer matrix, comprising
a thermoplastic polyolefin homopolymer or copolymer,
at least a vulcanizable elastomer selected from the group consisting of grafted carboxylated nitrile elastomers, acrylic elastomers, carboxylated polybutadienes, ethylene/propylene/diene terpolymers and mixtures of these polymers with the same elastomers, but which are not grafted, such as nitrile rubbers, polybutadiene, ethylene/propylene/diene terpolymers or a mixture thereof, (3) TPE materials of thermoplastic polystyrene elastomers (TPE-S) or modified styrene olefin elastomers or styrene olefin elastomers compounds, (4) TPE materials of thermoplastic chlorinated elastomers, (5) TPE materials of thermoplastic polyester elastomers, (6) TPE materials of thermoplastic polyamide elastomers, (7) TPE materials of thermoplastic fluorinated elastomers, and (8) TPE materials of thermoplastic polyurethane elastomers, with the proviso that the TPE materials (1) to (8) for the elastomer compositions (TPE) for the molding material of the third plastic layer do not comprise a polyamide compatibilizing agent.

The fluid conduits according to the present invention can be made even; alternatively they have walls which are continuously or at least partially corrugated, wherein according to the invention spirally corrugated walls are especially preferred. The tubing according to the present invention has an outer layer of a molding material of a harder polymer or a polymeric mixture, and an inner layer of a rubber-like polymer or a polymer mixture. Additionally, the inner layer can be provided on the innerside with a third layer of a thermoplastic adhesion-modified elastomer composition. Thus, according to the present invention, a material is selected for the layers which yields in the finished product a so-called "hard-soft-combination".

The rubber-like polymer composition or polymer mixture desirably has a hardness in the range of from about 30 Shore A to 60 Shore D, especially about 30 Shore A to 90 Shore A, and the hose line or tubing materials according to the present invention are selected so that they are processable by coextrusion or by the so-called conex method, respectively, and thereby adhere directly to each other non-positively or positively, i.e. without additional bonding agent, without delaminating. The outer layer desirably has a hardness of about 70 Shore D.

Especially preferred applications of the pipes according to the invention are in the field of automobiles for liquids conduits, air ducts or also fuel lines.

The present invention is described in more detail below partly in conjunction with drawings of certain preferred embodiments which are exemplary of the present invention.

BRIEF DESCRIPTION OF THE DRAWING

FIG. 4 is a graph showing the gamma profile of a pipe according to the present invention, but in the longitudinal direction.

DETAILED DESCRIPTION OF EMBODIMENTS

Figure 1:
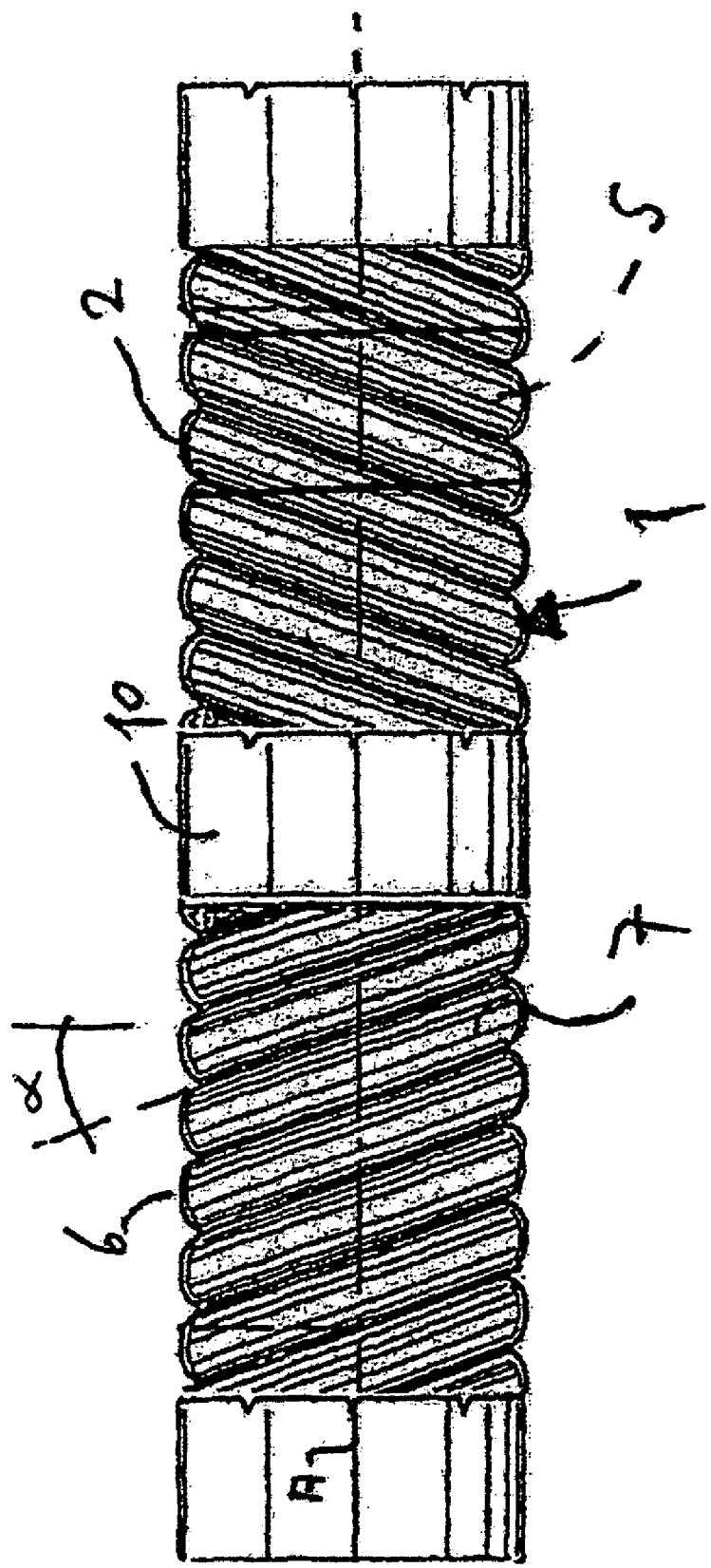
FIG. 1 is a partial schematic view of an embodiment according to the present invention wherein the conduit is only partially corrugated, the corrugated regions being interrupted by smooth regions in a two-layer corrugated pipe.

The present invention relates to a polymer hose line or tubing which has an outer layer of a molding material of a harder polymer or a harder polymer mixture and an inner layer of a rubber-like polymer or a rubber-like polymer mixture. Additionally, the inner layer can be provided on the inside with a further "soft" layer of a thermoplastic adhesion-modified elastomer composition. Thus, according to the invention a material selection is made for the layers which yields in the finished compound a so-called "hard-soft-combination". The inner layer or inner layers, respectively, being adjusted to be soft in comparison to the outer layer has or have a hardness of the starting polymer composition or mixtures in the range of from approximately 30 Shore A to 60 Shore D, especially of from 30 Shore A to 90 Shore A (each according to ISO 868).

According to the present invention, the outer layer 3 of the polymer hose line or tubing consists of a molding material based on (co)polyamides of polymerizates of aliphatic $C_6$ to $C_{12}$ lactams or ω-aminocarboxylic acids having four to 18 carbon atoms, wherein polyamide 12 or blends comprising predominantly polyamide 12 are especially preferred. Alternatively, homopolymers or copolymers which are obtainable by the polycondensation of at least one diamine of the group of aliphatic diamines having 4 to 12 C atoms, cycloaliphatic diamines having 7 to 22 C atoms and aromatic diamines having 6 to 22 C atoms in combination with at least one dicarboxylic acid of the group of aliphatic dicarboxylic acids having 4 to 12 C atoms, cycloaliphatic dicarboxylic acids having 8 to 24 C atoms and aromatic dicarboxylic acids having 8 to 20 C atoms can be used according to the invention as (co)polyamides, wherein also blends of the afore-mentioned polymerizates and/or polycondensates are suitable.

Figure 3:
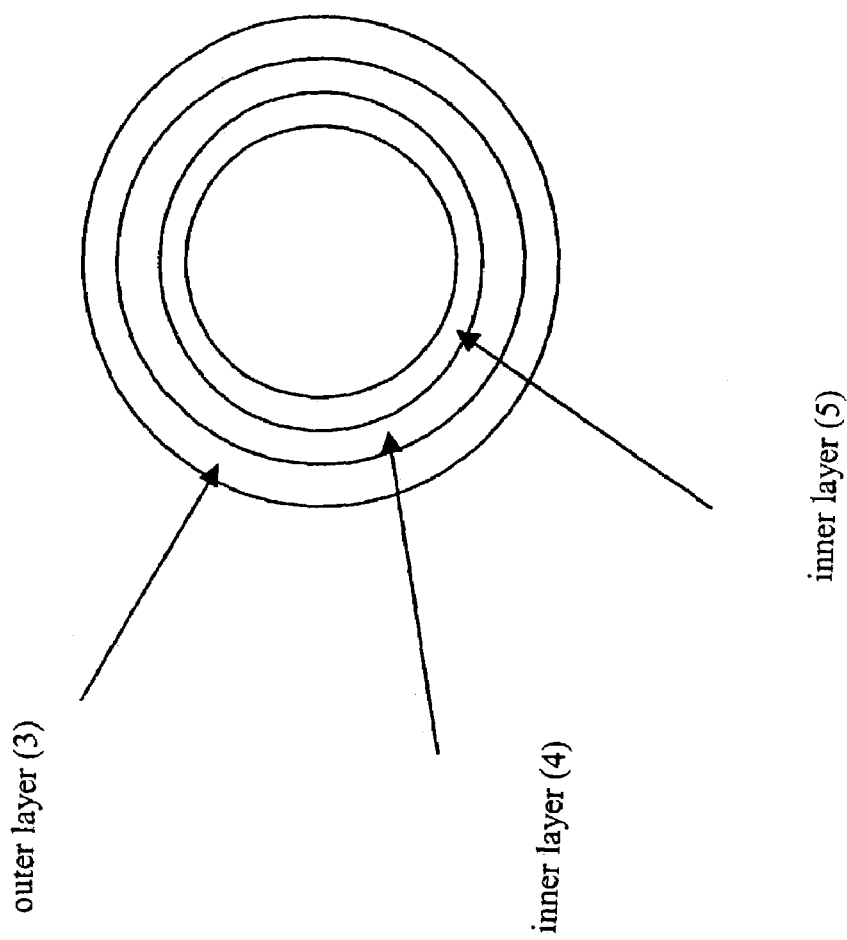
FIG. 3 schematically shows a cross-section through the wall of a conduit according to the present invention.
Figure 3:
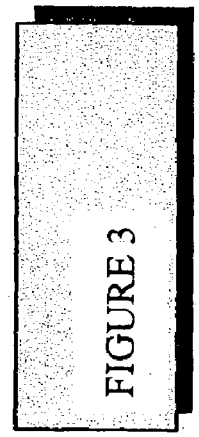

Noting FIG. 3, the inner layer 4 or the inner layers 4, 5, respectively, of the hose line or tubing according to the present invention consists of a molding material of a thermoplastic adhesion-modified elastomers with a cross-linkable rubber phase. The thermoplastic elastomers (TPEs) are selected from the group of the TPE materials consisting of (1) polyolefin elastomers, TPE materials of the type of (2) dynamically vulcanized rubbers in a polymer matrix, (3) thermoplastic polystyrene elastomers (TPE-S) or styrene copolymer elastomer compounds, (4) thermoplastic chlorinated elastomers, (5) polyester elastomers, (6) polyamide elastomers, (7) thermoplastic elastomers on basis of fluorine, and (8) thermoplastic polyurethane elastomers.

The TPE materials consisting of polyolefin elastomers (1), i.e. the so-called Santoprene types comprise (a) a thermoplastic polyolefin homopolymer or copolymer, especially polypropylene, which, if required, is produced, can be compounded with a block copolymer of styrene/conjugated diene/styrene and/or its halogenated derivates, (b) at least a functionalized, cross-linkable rubber-like material of the group the olefinic rubbers which can be uncross-linked, partially or fully cross-linked, the acrylates and the silicones, and (c) a polyamide compatibilizing agent.

In case of TPE materials of the Santoprene type (1), in contrast to the molding material for the additional inner layer 5, the thermoplastic adhesion-modified elastomer composition for the inner layer 4 can have an addition of a bonding agent of the group of the (co)polyamides, and especially an addition of polyamide 6, when the outer layer consists of polyamide 12. Thus, according to the present invention, the compatibilizing agent used for the TPE materials of the Santoprene type is a polyamide compatibilizing agent of the group of the (co)polyamides or adhesion-modified (co)polyamides or mixtures thereof, wherein the (co)polyamides are polymerizates of aliphatic $C_6$ to $C_{12}$ lactames or ω-aminocarboxylic acids with 4 to 18 carbon atoms, polyamide 6 being especially preferred, or homopolymers or copolymers, obtainable by the polycondensation of at least one diamine of the group of the aliphatic diamines with 4 to 12 C atoms, the cycloaliphatic diamines with 7 to 22 C atoms and the aromatic diamines with 6 to 22 C atoms in combination with at least one dicarboxylic acid of the group of aliphatic dicarboxylic acids with 4 to 12 C atoms, cycloaliphatic dicarboxylic acids with 8 to 24 C atoms and aromatic dicarboxylic acids with 8 to 20 C atoms, wherein also blends of the aforementioned polymerizates and/or polycondensates are suitable.

The TPE material of (2) dynamically vulcanized rubbers, of (3) thermoplastic polystyrene elastomers (TPE-S) or modified styrene olefin elastomers or styrene olefin elastomer compounds, of (4) thermoplastic chlorinated elastomers, of (5) thermoplastic polyester elastomers, of (6) thermoplastic polyamide elastomers, of (7) thermoplastic fluorinated elastomers, and of (8) thermoplastic polyurethane elastomers can be either itself modified in such a way, for example, by grafting with maleic anhydride or by reacting with epoxides, that they become adhesion modified, and thus the addition of a compatibilizing agent is made unnecessary. But, the TPE materials (2) to (8) can also comprise, if required, i.e. depending on the type of the elastomer, an addition of a polyamide or an adhesion modified polyamide, wherein the polyamide compatibilizing agent corresponds to that which is used for the Santoprene type materials (1). Further, the elastomer compositions of the types (2) to (8) can comprise non-polyamide compatibilizing agents. These are for example:

polyethylene, polypropylene, the ethylene/propylene-copolymers, the ethylene/butene-copolymers, wherein all that products are grafted with maleic anhydride or glycidyl methacrylate, the copoplymers of ethylene/alkyl(meth)acrylate/maleic anhydride, wherein the maleic anhydride can be grafted or copolymerized, the copolymers of ethylene/vinyl acetate/maleic anhydride, wherein the maleic anhydride can be grafted or copolymerized, the two preceding copolymers, wherein maleic anhydride is replaced by glycidyl methacrylate, the copolymers of ethylene/(meth)acrylic acid and, if desired, salts thereof, polyethylene, polypropylene, the ethylene/propylene copolymers, wherein that polymers are grafted by a product which offers a reactive site for amines; these grafted copolymers are then condensed with polyamides or the oligomers posses a single amino end group.

FR 22 91 225 and EP 342 066 A1 describe these products.

The amount of compatibilizing agent used is that amount which is sufficient so that the respective elastomer can be dispersed in the form of particles in the matrix. It can be up to 30 wt.-% of the polyolefin. Thus, by using the described compatibilizing agents, the adhesion of the TPEs according to the present invention to other polymers, copolymers or blends, such as they are present in the outer layer of the corrugated pipes described herein, is increased. As described above, the compatibilizing agents can be portions of other polymers, i.e. herein polyamide 6 or polyamide 12. When the thermoplastic polyolefin is a polypropylene, a compatibilizing agent which is advantageously a copolymer of ethylene with propylene with a predominantly number of units of the propylene, which is grafted with maleic acid is added and then condensed with monoamino oligomers of the caprolactam.

In an especially preferred embodiment, the polyamide bonding agent consists of or predominantly comprises a functionalized polyamide, i.e. the polyamide is provided with functionalized groups itself or reacted with a functionalized polyolefin, i.e. reacted either by means of a melting mixture or in a dryblend. These modification measures are known by those skilled in the art, for example from EP 753 027 B1.

The aforementioned thermoplastic adhesion modified elastomer compositions (TPE) used according to the invention belong to a special kind of thermoplastic elastomers which are obtained especially by methods of the dynamical vulcanization of rubber-like components, such as cross-linkable polyolefins or silicones which are dispersed in the form of fine particles in a thermoplastic basic material (polyolefins). Such thermoplastic elastomers, also called TPEs, are for example polymers and copolymers on basis of unsaturated olefins such as butadiene, isoprene etc., or also of acrylates or silicones, or also copolymers or polymer mixtures.

According to the present invention, a homopolymer or copolymer of a $C_2$ to $C_7$ monomer or copolymer with (meth)acrylates and/or vinyl acetates are used as polyolefin component of the TPEs. A preferred copolymer is a copolymer of ethylene with a (meth)acrylate and/or vinyl acetate.

Polypropylene, which comprises homopolymers of propylene as well as copolymers of polypropylene, which comprises 1 to 20 wt. % of ethylene or an α-olefin comonomer having 4 to 16 C atoms and mixtures thereof, is especially preferred as polyolefin. The polypropylene can be a highly crystalline isotactic or syndiotactic polypropylene. The amount of polyolefin, i.e. especially polypropylene, in the thermoplastic elastomer composition (TPE) can be 8 to 90 wt. % and especially 10 to 60 wt. %.

Thermoplastic vulcanizates are preferred among the afore-mentioned thermoplastic elastomers (TPEs). Such thermoplastic vulcanizates are thermoplastic elastomer blends on basis of polyamides, polyesters, polystyrenes or polyurethanes. The rubber-like components are generally cross-linkable polyolefins or silicones.

Especially preferred is that the rubber-like materials are of the group selected from EPDM, EPM, butyl rubber, halogenated butyl rubber, copolymers of isomonoolefin and para-alkylstyrene or its halogenated derivates, natural and synthetic rubbers, polyisoprene, polybutadiene rubber, styrene butadiene copolymer rubbers, nitrile rubbers, polychloroprene rubbers and mixtures thereof.

The cross linkage of the thermoplastic vulcanizates is performed during the mixing and compounding process. The thermoplastic vulcanizates are processable as thermoplastics, but occupy an intermediate position between TPEs and conventional vulcanizates.

Thermoplastic elastomer compositions (1) (TPEs) which comprise polyamide portions, i.e. in amounts of from 3 to 30 wt. %, especially 10 wt. %, i.e. polyamide 6 portions, are especially preferred according to the present invention. However, such molding materials are only used for the inner layer 4. In contrast thereto, the innermost layer 5, if present, arranged on the inside of layer 4, comprises no polyamide portions.

Rubber-like polymer blends of the so-called Santoprene-type are described, for example, by U.S. Pat. No. 6,005,052, U.S. Pat. No. 6,020,431 and EP 0 753 0 27 B1 (Advanced Elastomer Systems). Also, corresponding Santoprene® types are available on the market, Santoprene®-191-55PA or Santoprene 191®-85PA being mentioned herein as examples.

Further, the commercial articles Geolast® (Advanced Elastomer Systems), a polypropylene/NBR as well as further Adflex® (Montell), a thermoplastic polyolefin elastomer with the structure of atactic polypropylene/isotactic polypropylene, are mentioned as examples for dynamically vulcanized rubbers in polymer matrix. The commercial articles Thermolast® K (Kraiburg-Shell), a polypropylene/SEBS, Thermoflex® (PTS), a polypropylene/SEPS are mentioned as examples for thermoplastic styrene copolymer elastomer compounds.

Also, thermoplastic chlorinated and fluorinated elastomers are to be seen as further material groups for the TPE materials. Here, the commercial articles Alcryn® (DuPont), a PVDC/EVA (EVA is partially cross-linked) are available. Thermoplastic fluorinated elastomers available on the market are, for example, THV (3M/Hoechst), a PTFE-HFP-PVDF-Compound.

The polyester elastomers are to be mentioned as further group of suitable elastomers. Here, for example the commercial article Hytrel® (DuPont), a PBT + ethylene glycol polyester elastomer is mentioned.

Further polyamide elastomers are suitable according to the invention. They are polyether esteramides which derive for example from polyamide 12. The thermoplastic constituents are polyamide sequences, and the elastomer constituents are polyether sequences. These blocks are linked to each other by either ester or amide groups. Thus, they are so-called segmented block copolymers which combine properties of elastomers and thermoplastics. Corresponding products such as Grilon® ELX (Ems), Grilamid® ELY (Ems), Pebax® (Atofina) are available on the market.

Further, thermoplastic polyurethane elastomers are suitable elastomers according to the invention. For example, Desmopan® (Bayer) is available as a commercial product on the market. In addition, thermoplastic polyurethane elastomers (TPE-U) having a hardness in the range of from Shore A 65 to Shore D 75 can be employed as TPE materials used according to the invention.

Further, thermoplastic polystyrene elastomers (TPE-S), especially styrene olefin block copolymers are to be mentioned. These thermoplastic polystyrene elastomers can be modified styrene olefin elastomer compounds on the basis of the afore-mentioned thermoplastic styrene olefin elastomers. Generally, these compounds obtain 20 to 85 wt. % of high molecular triblock copolymers being functionalized with maleic anhydride or being not functionalized, which are constituted of stiff styrene end blocks and flexible olefin-middle blocks, and 15 to 70 wt. % of non-olefinic thermoplastic material (DE 198 45 235 describes such TPE-S).

Core-shell graft rubbers are to be mentioned as further group of suitable elastomers according to the invention. They are graft rubbers produced in emulsion consisting of at least a hard and a soft component. Commonly, one understands that a hard component is a polymerizate having a glass temperature of at least 25° C., and a soft component is a polymerizate having a glass temperature of maximum 0° C. These products have a structure of a core and at least one skin, wherein the structure results from the order of the monomer addition. The soft components derive from, among others, butadiene, isoprene, alkylacrylates or alkylmethacrylates and if required further comonomers. For example, styrene, acrylonitrile and cross-linking or graft-active monomers with more than one polymerizable double bond such as diallyl phtalate, divinyl benzene, butanediol diacrylate or triallyl(iso)cyanurate are to be mentioned herein as suitable comonomers. The hard components derive from, among others, styrene, a-methylstyrene and other copolymerizates, wherein preferably acrylonitrile, methacrylonitrile and methyl methacrylate are to be mentioned as comonomers.

Other suitable TPEs are disclosed in WO 01/18116 (Dow) which describes TPEs on basis of polyesters and/or polycarbonates with cross-linkable silicones.

Figure 2:
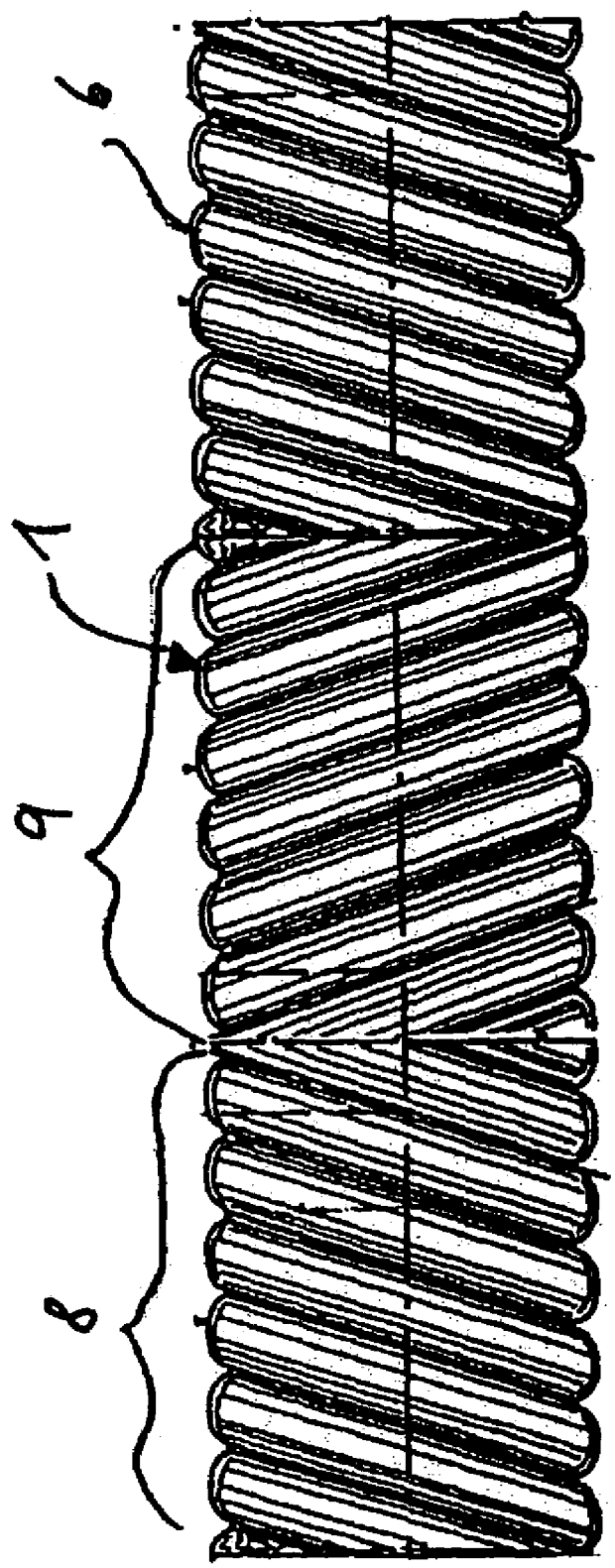
FIG. 2 is a partial schematic view of another embodiment according to the present invention having different corrugated sections wherein, in a two-layered corrugated pipe, regions of right helixes with left helixes follow one another directly.

Therefore, a pipe constituted of two layers 3 and 4, or three layers 3, 4 and 5, respectively, especially with spirally corrugation, e.g. FIGS. 1 and 2, which is a "hard-soft-combination" in relation to the material selection, wherein the outer layer 3 consists of (co)polyamides, especially polyamide 12, or a polymer mixture with polyamide 12 and the inner layer consists of a rubber-like polymer or a polymer mixture, is provided according to the invention. The inner layers 4, 5 have in comparison with the outer harder layer a Shore hardness in the range of from 30 Shore A to 90 Shore A.

As is well-known, burst pressure resistant materials for the outer layer 3 are polyamides. But, according to the invention (co)polyamides which are obtainable from polymerizates of aliphatic $C_6$ to $C_{12}$ lactames or ω-aminocarboxylic acids having 4 to 18 C atoms are selected. In an alternative embodiment polyamides which are homopolymers or copolymers which are obtainable from the polycondensation of at least one diamine of the group of the aliphatic diamines having 4 to 12 C atoms, the cycloaliphatic diamines having 7 to 22 C atoms and the aromatic diamines having 6 to 22 C atoms in combination with at least one dicarboxylic acid of the group of aliphatic dicarboxylic acids having 4 to 12 C atoms, cycloaliphatic dicarboxylic acids having 8 to 24 C atoms and aromatic dicarboxylic acids having 8 to 20 C atoms are selected, wherein blends of the aforementioned polymerizates and/or polycondensates are also suitable.

Especially, PA 12 is preferably selected. In this connection polyamide 12 materials having an excess of amino end groups to carboxyl end groups are in turn especially preferred according to the invention. The polyamide 12 materials which are used according to the present invention and have an excess of amino end groups, i.e. which have a carboxyl to amino end-group ratio of about 0.3, are more stable against hydrolytic degradation in hot water or cooling water, such it is used in automobiles, with regard to polyamide 12 materials having equalized end group ratios, i.e. a carboxyl to amino end group ratio of about 1.0 or an excess of acid end groups. Further, PA 12 materials having amino end group excess have a significantly better and persisting adhesion to polyolefins having functional side groups. Also, this adhesion is not loosen by permanent attacks of heat and water.

The polyamide materials used according to the invention can be modified with all common processing and use demanded additives. Also, other polymers, plasticizers, stabilizers or lubricants can be added.

In an especially preferred embodiment of the invention, the molding material for the outer polyamide layer comprises nano-scale fillers in an amount of 0.5 to 50 wt. %, especially in an amount of 1 to 30 wt. %, per 100 portions by weight of the polymer matrix. The nano-scale fillers used according to the invention are chosen from the group comprising the metal or semi-metal oxides or oxide hydrates. In particular, the nano-scale fillers are chosen from the group of oxides and oxide hydrates of an element of the group comprising boron, aluminum, gallium, indium, silicon, germanium, tin, titanium, zirconium, zinc, yttrium or iron. In one particular embodiment of the present invention, the nano-scale fillers are either silicon dioxide or silicon dioxide hydrates.

In one embodiment, the nano-scale fillers are present in the polyamide molding material in a uniformly dispersed, layered form. Prior to being incorporated into the matrix they have a layer thickness of 0.7 to 1.2 mm and an interlayer separation of the mineral layers of up to 5 nm.

In the polyamide (PA) systems in which the filler particle dimensions are in the nanometer range, there are the following effects: the thermal expansion coefficient is clearly reduced compared with the unfilled matrix polymers particularly in the processing direction, the finely distributed particles reduce the permeation of gases and liquids like water without reducing viscosity as in classically filled systems (composites). By virtue of the molecular reinforcement, mechanical properties are improved even at elevated temperatures.

Such materials, which can be added at any stage in manufacturing the polymer, whereby they can be finely distributed in the nanometer range, are suitable as fillers for manufacturing nano-composites. These are according to the present invention preferably minerals which already have a layered structure such as layered silicates, double hydroxides such as hydrotalcite or even graphite. Nano-fillers based on silicones, silica or silsesquioxanes (I) are also suitable.

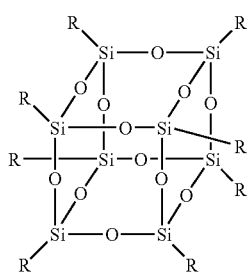

In the context of the present invention, layered silicates are understood to be 1:1 and 2:1 layered silicates. In these systems, layers of $SiO_4$ tetrahedrons are regularly linked together with layers comprised of $M(O,OH)_{6-}$ octahedrons. Therein, M represents metal ions such as Al, Mg, Fe. In the 1:1 layered silicates one tetrahedron layer is connected with one octahedron layer respectively. Examples of these are kaolin and serpentine minerals.

In the case of the 2:1 layered silicates, two tetrahedron layers are combined with one octahedron layer respectively. If all octahedron places are not available with cations of the required charge for compensation of the negative charge of the $SiO_4$ tetrahedrons and the hydroxide ions, charged layers occur. This negative charge is balanced by the insertion of monovalent cations like potassium, sodium or lithium or divalent cations such as calcium into the space between the layers. Examples of 2:1 layered silicates are talc, mica, vermiculites, illites and smectites, wherein the smectites including montmorillonite, can be easily swelled with water due to their layer charge. Furthermore, the cations are easily accessible for exchange processes.

The swellable layered silicates are characterized by their ion exchange capacity CEC (meq/g) and their layer separation $d_L$. Typical values for CEC are between 0.7 to 0.8 meq/g. The layer separation in a dry, untreated montmorillonite is 1 nm and increases up to 5 nm with swelling with water or coating with organic compounds.

Examples of cations which can be used for exchange reactions are ammonium salts of primary amines having at least 6 carbon atoms such as hexane amine, decane amine, dodecane amine, hydrated $C_{18}$ tall oil amines or even quaternary ammonium compounds such as ammonium salts of α-, ω-amino acids with at least 6 carbon atoms. Other activation reagents containing nitrogen are the triazine-based compounds. Such compounds are described, for example, in EP-A-1 074 581, to which particular reference is made.

Chlorides, sulfates or even phosphates are suitable anions. Also, along with the ammonium salts, sulfonium or phosphonium salts such as tetraphenyl or tetrabutyl phosphonium halides, for example, can be used.

Since polymers and minerals commonly have very different surface tensions, bonding agents also can be used according to the present invention for treating the minerals for cation exchange. When this is done, titanates or even silanes such a γ-amino propyl triethoxy silane are appropriate.

The hose line or tubing according to the invention is two-layered or three-layered and easily producible on the conventional plants by means of coextrusion or by means of the so-called and known conex method which is described below. The tubing according to the present invention can be formed even, i.e. without a corrugated wall. In a preferred embodiment it has at least in sections a corrugated wall (see FIG. 1) which is in an especially preferred embodiment a spirally corrugated wall.

Therefore, in a special embodiment, the invention relates to two-layer or three-layer polymer hose lines or tubings which have at least in sections a spirally corrugated wall and which consist of an outer layer 3 of a moulding material on basis of (co)polyamides of the group of aliphatic $C_6$ to $C_{12}$ lactames or ω-aminocarboxylic acids having 4 to 18 C atoms, polyamide 12 being especially preferred, and an inner layer 4 which is connected directly non-positively or positively, respectively, to the outer layer, i.e. adheres to it without delaminating.

In an alternative embodiment, the outer layer 3 consists of a molding material on the basis of copolyamides which are homopolymers or copolymers, obtainable from the polycondensation of at least one diamine of the group of the aliphatic diamines having 4 to 12 C atoms, the cycloaliphatic diamines having 7 to 22 C atoms and the aromatic diamines having 6 to 22 C atoms in combination with at least one dicarboxylic acid of the group of aliphatic dicarboxylic acids having 4 to 12 C atoms, cycloaliphatic dicarboxylic acids having 8 to 24 C atoms and aromatic dicarboxylic acids having 8 to 20 C atoms, wherein also blends of the aforementioned polymerizates and/or polycondensates are suitable.

The inner layer 4 consists of a molding material of a thermoplastic adhesion modified elastomer composition (TPE) comprising (a) a thermoplastic polyolefin homopolymer or copolymer which can be compounded with a block copolymer of styrene/conjugated diene/styrene and/or its halogenated derivates, and (b) a cross-linkable rubber-like material of the group of olefins, acrylates or silicones and (c) a compatibilizing agent of the group of polyamides or adhesion-modified polyamides, obtainable of aliphatic $C_6$ to $C_{12}$ lactames or ω-aminocarboxylic acids having 4 to 18 C atoms, wherein polyamide 6 can be especially preferred.

In an alternative embodiment according to the invention, the inner plastic layer 4 comprising a modified thermoplastic elastomer having rubber phase comprises additionally on the inside thereof a plastic layer 5 comprising a modified thermoplastic elastomer having rubber phase, wherein the moulding material for this second inner layer 5 consists of a thermoplastic elastomer composition such as a copolymer of a functionalized polyolefin as main component together with a cross-linkable rubber-like material, but without polyamide compatibilizing agent.

For the aforementioned layers 4, 5 of the hose line or tubing according to the present invention it is essential that it be resistant to cooling water, i.e. resistant to hot water and ethylene glycol or derivates of ethylene glycol, respectively, as well as anticorrosive additives, up to at least 140° C.

The stiffness and the strength of the two-layer or three-layer pipes according to the present invention can be adjusted by variation of the layer thickness, i.e. the wall thickness ratio of the layers is different along the length of the conduit. Depending on the application kind and object the diameters of the conduits according to the invention can vary. For example, the conduits can have inner diameters in the range of from 5 mm to 50 mm. The layer thicknesses of the single layers of the embodiments according to the invention can be adapted to the use requirements, for example, with regard to barrier effects, burst pressure resistance or impact strength, and normally will vary between 0.5 mm and 3 mm.

In a special embodiment of the invention the wall thickness ratio of the layers can be different along the length of the conduit.

The pipe according to the invention can comprise continuously or also only partially corrugated regions and be interrupted by smooth regions 10 as shown in FIG. 1. An embodiment of the corrugated pipe according to the invention has a spirally corrugated wall, as shown in the accompanying FIGS. 1 and 2. The corrugated pipe 1 according to the invention comprises at least a corrugated portion 2 which has at least a continuous rib or web 6 extending along a substantially helical path S. The corrugated portion 2 comprises in its non-deformed state a number of identical turns 7, wherein the turns 7 each have the same winding angle α.

In a preferred embodiment as shown in FIG. 2, the corrugated pipe according to the invention has a profile which is defined by a succession of alternating, mutually connected outer crests and depressions. Therein, the depressions are tapered to the bottom and are substantially U-shaped and have a substantially flat intermediate portion which extends along the axis A of the pipe. Further, the depressions comprise two substantially flat lateral portions which are converging and run against the intermediate portions. In an alternative embodiment the depressions can be V-shaped, and comprise a rounded vertex.

In a special embodiment according to the invention, also shown in FIG. 2, the portions having so-called "right screws" 8 with "left screws" or "helixes" 9 can follow directly one after another. Additionally, the extensions can be reduced still further by this special geometry in hot state.

In an embodiment of use, the corrugated tubing according to the invention can be used as a cooling liquid conduit in automobiles.

An advantage of the pipes according to the present invention, especially corrugated pipes, is that they can be welded on easily on adjacent moulded portions of plastic or metal due to the used special combination of the outer and inner layer materials so that they are tight and compression-proof at the joints. By the spirally corrugated wall of the corrugated pipe, the extension is reduced significantly as a result of a temperature increase, such as for example in the engine compartment of an automobile. By the two-layer or three-layer construction, the corrugated pipes according to the present invention with the lower extension can be produced more easily and economical. To further increase the strength or to reduce the extension of the corrugated pipes according to the invention, the outer layer materials can be modified with nano-scale fillers.

The hose lines or tubings according to the present invention can be produced in one or more steps by injection molding, coextrusion, extrusion blow molding, milling or sheating methods. Further, it is possible to produce the hose lines or tubings by the so-called conex method which is a form of coextrusion wherein the single layers are applied one over the other comparable to in a winding method. This method being described in WO 97/28949. By manufacturing according to the conex method, an orientation of the single layers which is comparable to a film stretching effect is achieved.

The corrugated pipes according to the invention are especially suitable as cooling liquid conduits in automobiles, as mentioned above. Additionally, they are especially suitable for use as aeration lines and de-airing lines as well as fuel lines or portions of fuel lines in automobiles.

Returning to the illustrated embodiments, the spirally corrugated two-layer polymer tubing 1, as shown in FIG. 1, has a corrugated wall in the portions 2. The tubing 1 is interrupted by smooth portions 10. The corrugated pipe 1 according to the present invention consists of an outer polyamide 12 layer 3 and an inner layer 4 of a thermoplastic elastomer which is sold under the commercial name "Santoprene 191-55 PA". Alternatively, the Santoprene 191-85 PA is used which differs from Santoprene 191-55 PA only in that it has a Shore A hardness of 85 (cf. Table 2).

The two-layer corrugated pipe according to the invention is not only dimensional stable, diffusion-safe and compression-proof to high and low temperatures, but also resistant to aggressive chemicals within and without. Depending on the application field, a second inner layer 5 of modified thermoplastic elastomer with rubber phase can be present (cf. FIG. 3).

The tubing 1 has an axis A and has a central corrugated portion 2 and three smooth lateral portions 10. In FIG. 1, the corrugated portion 2 has at least five identical, continuous ribs extending along longitudinally in a substantially helical path. In non-deformed state the corrugated portion 2 has a number of identical turns each having the same winding angle α.

In FIG. 2, regions of right screws 8 with left screws 9 follow one another flush.

The following example describes the production of the corrugated pipe shown in FIG. 1. The produced corrugated pipe according to the invention has, for example, an outer layer of a polyamide 12 having the following properties shown in Table 1 (below). The polyamide 12 material had a carboxyl to amino end group ratio of about 0.3. The polyamide 12 material is sold commercially by Ems-Grivory, Domat/Ems, Switzerland, under the name Grilamid L 25 AH. The corrugated pipe according to the invention has an inner layer of a thermoplastic rubber material with the commercial name "Santoprene 191-55 PA" (Producer: Advanced Elastomer Systems).

Alternatively to the polyamide 12 material described above, a polyamide 12 material which is modified with nanocomposites, i.e. with layered silicates, (cf. Table 1: "PA12-nanocomposites") can be used. The layered silicates are sodium montmorillonite treated with 30 meq/100 g of mineral of methyl tall oil bis-2-hydroxyethyl-ammoniumchloride. The nanocomposite molding materials were produced on a 30 mm-twin-screw extruder ZSK 25 of the company Werner and Pfleiderer at temperatures between 240 and 280° C. Thereby, the polymer was metered in the feeding of the extruder and the mineral was metered in the feeding zone of the extruder or the melt. The addition of modified layered silicate was 6 wt. %.

TABLE 1 polyamide 12: highly viscous PA12 with following properties

| | melting point (° C.) | relative viscosity (0.5% in m-cresol) | MVI, 275° C., 5 kg (cm³/10 min) | Ash content (%) |
|---|---|---|---|---|
| standard PA12* | 178 | 2.25 | 20 | 0.1 |
| PA12-nanocomposite | 178 | 2.18 | 13 | 4 |

*Grilamid L25AH

TABLE 2

Properties of Santoprene 191-55 PA

| Property | Testing method | Unit | Value |
|---|---|---|---|
| hardness, 15 seconds | ISO 868 | Shore A | 55 |
| specific density | ASTMD 792 | | 0.95 |
| Ultimate tensile strength | ASTMD 412 | MPa | 2.9 |
| Elongation at break | ASTMD 412 | Percent | 290 |
| Tension at 100% elongation | ASTMD 412 | MPa | 1.6 |
| Tensile strength | ISO 34, method B, b | N/mm 23° C. | 13 |

For determining the length variations, two-layer corrugated pipes were produced from the materials described above on a Nokia pipe extrusion plant. The layer thickness of both layers was the same. The thickness of the pipe wall in the even regions was 1.5 mm, and in the corrugated regions approximately 1 mm.

TABLE 3

| | Gamma - profile | Spiral - profile (inventive) |
|---|---|---|
| Initial length | 112 mm | 112 mm |
| Just clamped (fixed at one end) | 155 mm | 143 mm |
| Just clamped (fixed at both ends) | 155 mm | 143 mm |
| 90° bend (fixed at both ends) | 150 mm | 126 mm |

An example for the gamma profile, cut in the longitudinal pipe direction, is given in graphical form in FIG. 4. The rib profile is circular in this case.

FIG. 3 shows a cross-section through a three-layer pipe according to the invention. The pipe has an outer layer 3 of polyamide 12 having an amino end group excess and an inner layer of a thermoplastic elastomer which is sold under the commercial name Santoprene® 191-55 PA. Further, a layer which consists also of Santoprene®, but without polyamide 6 bonding agent connects thereto further on the inside.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A multilayer polymer hose line or tubing resistant to length variations under different temperature conditions, made of thermoplastic polymers processable by coextrusion, for use as a pressurized fluid conduit, consisting of an outer layer and
   an inner layer which is directly bonded to the outer layer,
   wherein the outer layer consists essentially of polyamide 12 which has an excess of amino end groups to carboxylic end groups, and
   said inner layer consists essentially of molding material of a thermoplastic adhesion-modified elastomer composition (TPE) comprising a mixture of EPDM, polypropylene copolymer and a polyamide.

2. A multilayer polymer hose line or tubing according to claim 1, wherein the polyamide 12 of the outer layer is modified with processing and use demanded additives.

3. A multilayer polymer hose line or tubing according to claim 1, wherein the polyamide 12 of the outer layer comprises nano-scale fillers in an amount of 0.5 to 50 wt. %, per 100 portions by weight of the polyamide 12.

4. The multilayer polymer hose line or tubing of claim 3 wherein said filler is present in an amount of 1–30 wt % per 100 parts by weight of the polyamide 12.

5. The multilayer polymer hose line or tubing of claim 1, wherein said thermoplastic polypropylene copolymer of said TPE material of said inner layer comprises 8–90 wt % polypropylene.

6. The multilayer polymer hose line or tubing according to claim 5, wherein said polypropylene copolymer of said inner layer comprises 10–60 wt % polypropylene.

7. The multilayer polymer hose line or tubing according to claim 1, wherein said polyamide of said adhesion-modified elastomer composition of said inner layer consists essentially of polyamide 6.

8. A multilayer polymer hose line or tubing according to claim 1, wherein the thermoplastic, adhesion-modified elastomer composition (TPE) used for said inner layer has a hardness in the range of 30 Shore A to 60 Shore D, as measured according to ISO 868.

9. The multilayer polymer hose line or tubing of claim 8, wherein said hardness is in the range of 30 Shore A to 90 Shore A.

10. A multilayer polymer hose line or tubing according to claim 1, wherein the wall thickness ratio of the layers is different along the length thereof.

11. A multilayer polymer hose line or tubing according to claim 1, comprising at least in sections a corrugated wall.

12. The multilayer polymer hose line or tubing of claim 11, wherein said corrugated wall or sections of corrugated wall comprise a spirally corrugated wall.

* * * * *